US008140272B2

United States Patent
Pav

(10) Patent No.: US 8,140,272 B2
(45) Date of Patent: Mar. 20, 2012

(54) SYSTEM AND METHOD FOR UNMIXING SPECTROSCOPIC OBSERVATIONS WITH NONNEGATIVE MATRIX FACTORIZATION

(75) Inventor: Steven E. Pav, San Francisco, CA (US)

(73) Assignee: Nellcor Puritan Bennett LLC, Boulder, CO (US)

( * ) Notice: Subject to any disclaimer, the term of this patent is extended or adjusted under 35 U.S.C. 154(b) by 404 days.

(21) Appl. No.: 12/412,947

(22) Filed: Mar. 27, 2009

(65) Prior Publication Data

US 2009/0248320 A1 Oct. 1, 2009

Related U.S. Application Data

(60) Provisional application No. 61/072,096, filed on Mar. 27, 2008.

(51) Int. Cl.
*G06F 19/00* (2011.01)
*G01J 3/40* (2006.01)
(52) U.S. Cl. .......................... 702/23; 356/310
(58) Field of Classification Search ............. 702/23, 702/189; 356/302, 310, 330
See application file for complete search history.

(56) References Cited

U.S. PATENT DOCUMENTS

| | | | |
|---|---|---|---|
| 3,638,640 A | 2/1972 | Shaw | |
| 4,714,341 A | 12/1987 | Hamaguri et al. | |
| 4,805,623 A | 2/1989 | Jöbsis | |
| 4,807,631 A | 2/1989 | Hersh et al. | |
| 4,911,167 A | 3/1990 | Corenman et al. | |
| 4,913,150 A | 4/1990 | Cheung et al. | |
| 4,936,679 A | 6/1990 | Mersch | |
| 4,938,218 A | 7/1990 | Goodman et al. | |
| 4,971,062 A | 11/1990 | Hasebe et al. | |
| 4,972,331 A | 11/1990 | Chance | |
| 4,974,591 A | 12/1990 | Awazu et al. | |
| 5,028,787 A | 7/1991 | Rosenthal et al. | |
| 5,065,749 A | 11/1991 | Hasebe et al. | |
| 5,084,327 A | 1/1992 | Stengel | |
| 5,119,815 A | 6/1992 | Chance | |
| 5,122,974 A | 6/1992 | Chance | |
| 5,167,230 A | 12/1992 | Chance | |

(Continued)

FOREIGN PATENT DOCUMENTS

EP 352923 1/1990

(Continued)

OTHER PUBLICATIONS

Leahy, Martin J., et al.; "Sensor Validation in Biomedical Applications," *IFAC Modelling and Control in Biomedical Systems*, Warwick, UK; pp. 221-226 (1997).

Barreto, Armando B., et al.; "Adaptive LMS Delay Measurement in dual Blood Volume Pulse Signals for Non-Invasive Monitoring," *IEEE*, pp. 117-120 (1997).

East, Christine E., et al.; "Fetal Oxygen Saturation and Uterine Contractions During Labor," *American Journal of Perinatology*, vol. 15, No. 6, pp. 345-349 (Jun. 1998).

(Continued)

*Primary Examiner* — Bryan Bui

(57) ABSTRACT

Systems and methods for unmixing spectroscopic data using nonnegative matrix factorization during spectrographic data processing are provided according to various embodiments. In an embodiment, a method of processing spectrographic data may include receiving optical absorbance data associated with a sample and iteratively computing values for component spectra using nonnegative matrix factorization. The values for component spectra may be iteratively computed until optical absorbance data is approximately equal to a Hadamard product of a pathlength matrix and a matrix product of a concentration matrix and a component spectra matrix. The method may also include iteratively computing values for pathlength using nonnegative matrix factorization, in which pathlength values may be iteratively computed until optical absorbance data is approximately equal to a Hadamard product of the pathlength matrix and the matrix product of the concentration matrix and the component spectra matrix.

19 Claims, 4 Drawing Sheets

U.S. PATENT DOCUMENTS

| | | |
|---|---|---|
| 5,187,672 A | 2/1993 | Chance |
| 5,190,038 A | 3/1993 | Polson et al. |
| 5,246,003 A | 9/1993 | DeLonzor |
| 5,247,931 A | 9/1993 | Norwood |
| 5,263,244 A | 11/1993 | Centa et al. |
| 5,275,159 A | 1/1994 | Griebel |
| 5,279,295 A | 1/1994 | Martens et al. |
| 5,297,548 A | 3/1994 | Pologe |
| 5,355,880 A | 10/1994 | Thomas et al. |
| 5,372,136 A | 12/1994 | Steuer et al. |
| 5,385,143 A | 1/1995 | Aoyagi |
| 5,390,670 A | 2/1995 | Centa et al. |
| 5,402,778 A | 4/1995 | Chance |
| 5,413,099 A | 5/1995 | Schmidt et al. |
| 5,469,845 A | 11/1995 | DeLonzor et al. |
| 5,482,036 A | 1/1996 | Diab et al. |
| 5,483,646 A | 1/1996 | Uchikoga |
| 5,553,614 A | 9/1996 | Chance |
| 5,564,417 A | 10/1996 | Chance |
| 5,575,284 A | 11/1996 | Athan |
| 5,575,285 A | 11/1996 | Takanashi et al. |
| 5,611,337 A | 3/1997 | Bukta |
| 5,630,413 A | 5/1997 | Thomas et al. |
| 5,645,059 A | 7/1997 | Fein et al. |
| 5,645,060 A | 7/1997 | Yorkey |
| 5,680,857 A | 10/1997 | Pelikan et al. |
| 5,692,503 A | 12/1997 | Kuenstner |
| 5,730,124 A | 3/1998 | Yamauchi |
| 5,758,644 A | 6/1998 | Diab et al. |
| 5,779,631 A | 7/1998 | Chance |
| 5,782,757 A | 7/1998 | Diab et al. |
| 5,786,592 A | 7/1998 | Hök |
| 5,818,045 A * | 10/1998 | Mark et al. ............... 250/339.12 |
| 5,830,136 A | 11/1998 | DeLonzor et al. |
| 5,830,139 A | 11/1998 | Abreu |
| 5,831,598 A | 11/1998 | Kauffert et al. |
| 5,842,981 A | 12/1998 | Larsen et al. |
| 5,871,442 A | 2/1999 | Madarasz et al. |
| 5,873,821 A | 2/1999 | Chance et al. |
| 5,920,263 A | 7/1999 | Huttenhoff et al. |
| 5,995,855 A | 11/1999 | Kiani et al. |
| 5,995,856 A | 11/1999 | Mannheimer et al. |
| 5,995,859 A | 11/1999 | Takahashi |
| 6,011,986 A | 1/2000 | Diab et al. |
| 6,064,898 A | 5/2000 | Aldrich |
| 6,081,742 A | 6/2000 | Amano et al. |
| 6,088,607 A | 7/2000 | Diab et al. |
| 6,120,460 A | 9/2000 | Abreu |
| 6,134,460 A | 10/2000 | Chance |
| 6,150,951 A | 11/2000 | Olejniczak |
| 6,154,667 A | 11/2000 | Miura et al. |
| 6,163,715 A | 12/2000 | Larsen et al. |
| 6,181,958 B1 | 1/2001 | Steuer et al. |
| 6,181,959 B1 | 1/2001 | Schöllermann, dec'd et al. |
| 6,230,035 B1 | 5/2001 | Aoyagi et al. |
| 6,266,546 B1 | 7/2001 | Steuer et al. |
| 6,285,895 B1 | 9/2001 | Ristolainen et al. |
| 6,312,393 B1 | 11/2001 | Abreu |
| 6,353,750 B1 | 3/2002 | Kimura et al. |
| 6,397,091 B2 | 5/2002 | Diab et al. |
| 6,415,236 B2 | 7/2002 | Kobayashi et al. |
| 6,419,671 B1 | 7/2002 | Lemberg |
| 6,438,399 B1 | 8/2002 | Kurth |
| 6,461,305 B1 | 10/2002 | Schnall |
| 6,466,809 B1 | 10/2002 | Riley |
| 6,487,439 B1 | 11/2002 | Skladnev et al. |
| 6,501,974 B2 | 12/2002 | Huiku |
| 6,501,975 B2 | 12/2002 | Diab et al. |
| 6,526,301 B2 | 2/2003 | Larsen et al. |
| 6,544,193 B2 | 4/2003 | Abreu |
| 6,546,267 B1 | 4/2003 | Sugiura et al. |
| 6,549,795 B1 | 4/2003 | Chance |
| 6,580,086 B1 | 6/2003 | Schulz et al. |
| 6,591,122 B2 | 7/2003 | Schmitt |
| 6,594,513 B1 | 7/2003 | Jobsis et al. |
| 6,606,509 B2 | 8/2003 | Schmitt |
| 6,606,511 B1 | 8/2003 | Ali et al. |
| 6,615,064 B1 | 9/2003 | Aldrich |
| 6,618,042 B1 | 9/2003 | Powell |
| 6,622,095 B2 | 9/2003 | Kobayashi et al. |
| 6,654,621 B2 | 11/2003 | Palatnik et al. |
| 6,654,624 B2 | 11/2003 | Diab et al. |
| 6,658,276 B2 | 12/2003 | Kianl et al. |
| 6,658,277 B2 | 12/2003 | Wasserman |
| 6,662,030 B2 | 12/2003 | Khalil et al. |
| 6,668,183 B2 | 12/2003 | Hicks et al. |
| 6,671,526 B1 | 12/2003 | Aoyagi et al. |
| 6,671,528 B2 | 12/2003 | Steuer et al. |
| 6,678,543 B2 | 1/2004 | Diab et al. |
| 6,684,090 B2 | 1/2004 | Ali et al. |
| 6,690,958 B1 | 2/2004 | Walker et al. |
| 6,697,658 B2 | 2/2004 | Al-Ali |
| 6,708,048 B1 | 3/2004 | Chance |
| 6,711,424 B1 | 3/2004 | Fine et al. |
| 6,711,425 B1 | 3/2004 | Reuss |
| 6,714,245 B1 | 3/2004 | Ono |
| 6,731,274 B2 | 5/2004 | Powell |
| 6,785,568 B2 | 8/2004 | Chance |
| 6,793,654 B2 | 9/2004 | Lemberg |
| 6,801,797 B2 | 10/2004 | Mannheimer et al. |
| 6,801,798 B2 | 10/2004 | Geddes et al. |
| 6,801,799 B2 | 10/2004 | Mendelson |
| 6,829,496 B2 | 12/2004 | Nagai et al. |
| 6,842,635 B1 | 1/2005 | Parker |
| 6,850,053 B2 | 2/2005 | Daalmans et al. |
| 6,863,652 B2 | 3/2005 | Huang et al. |
| 6,873,865 B2 | 3/2005 | Steuer et al. |
| 6,889,153 B2 | 5/2005 | Dietiker |
| 6,898,451 B2 | 5/2005 | Wuori |
| 6,939,307 B1 | 9/2005 | Dunlop |
| 6,947,780 B2 | 9/2005 | Scharf |
| 6,949,081 B1 | 9/2005 | Chance |
| 6,961,598 B2 | 11/2005 | Diab |
| 6,983,178 B2 | 1/2006 | Fine et al. |
| 6,993,371 B2 | 1/2006 | Kiani et al. |
| 6,996,427 B2 | 2/2006 | Ali et al. |
| 7,024,235 B2 | 4/2006 | Melker et al. |
| 7,027,849 B2 | 4/2006 | Al-Ali |
| 7,030,749 B2 | 4/2006 | Al-Ali |
| 7,035,697 B1 | 4/2006 | Brown |
| 7,047,056 B2 | 5/2006 | Hannula et al. |
| 7,127,278 B2 | 10/2006 | Melker et al. |
| 7,162,306 B2 | 1/2007 | Caby et al. |
| 7,209,775 B2 | 4/2007 | Bae et al. |
| 7,221,970 B2 | 5/2007 | Parker |
| 7,236,811 B2 | 6/2007 | Schmitt |
| 7,236,813 B2 | 6/2007 | Parker |
| 7,263,395 B2 | 8/2007 | Chan et al. |
| 7,272,426 B2 | 9/2007 | Schmid |
| 7,289,835 B2 | 10/2007 | Mansfield |
| 7,373,193 B2 | 5/2008 | Al-Ali et al. |
| 7,400,918 B2 | 7/2008 | Parker |
| 2001/0020122 A1 | 9/2001 | Steuer et al. |
| 2001/0039376 A1 | 11/2001 | Steuer et al. |
| 2001/0044700 A1 | 11/2001 | Kobayashi et al. |
| 2002/0026106 A1 | 2/2002 | Khalil et al. |
| 2002/0035318 A1 | 3/2002 | Mannheimer et al. |
| 2002/0038079 A1 | 3/2002 | Steuer et al. |
| 2002/0042558 A1 | 4/2002 | Mendelson |
| 2002/0049389 A1 | 4/2002 | Abreu |
| 2002/0062071 A1 | 5/2002 | Diab et al. |
| 2002/0111748 A1 | 8/2002 | Kobayashi et al. |
| 2002/0133068 A1 | 9/2002 | Huiku |
| 2002/0156354 A1 | 10/2002 | Larson |
| 2002/0161287 A1 | 10/2002 | Schmitt |
| 2002/0161290 A1 | 10/2002 | Chance |
| 2002/0165439 A1 | 11/2002 | Schmitt |
| 2002/0198443 A1 | 12/2002 | Ting |
| 2003/0023140 A1 | 1/2003 | Chance |
| 2003/0055324 A1 | 3/2003 | Wasserman |
| 2003/0060693 A1 | 3/2003 | Monfre et al. |
| 2003/0139687 A1 | 7/2003 | Abreu |
| 2003/0144584 A1 | 7/2003 | Mendelson |
| 2003/0220548 A1 | 11/2003 | Schmitt |
| 2003/0220576 A1 | 11/2003 | Diab |
| 2004/0010188 A1 | 1/2004 | Wasserman |
| 2004/0054270 A1 | 3/2004 | Pewzner et al. |

| | | | |
|---|---|---|---|
| 2004/0087846 | A1 | 5/2004 | Wasserman |
| 2004/0107065 | A1 | 6/2004 | Al-Ali |
| 2004/0127779 | A1 | 7/2004 | Steuer et al. |
| 2004/0171920 | A1 | 9/2004 | Mannheimer et al. |
| 2004/0176670 | A1 | 9/2004 | Takamura et al. |
| 2004/0176671 | A1 | 9/2004 | Fine et al. |
| 2004/0230106 | A1 | 11/2004 | Schmitt et al. |
| 2005/0080323 | A1 | 4/2005 | Kato |
| 2005/0101850 | A1 | 5/2005 | Parker |
| 2005/0113651 | A1 | 5/2005 | Wood et al. |
| 2005/0113656 | A1 | 5/2005 | Chance |
| 2005/0131286 | A1 | 6/2005 | Parker |
| 2005/0168722 | A1 | 8/2005 | Forstner et al. |
| 2005/0177034 | A1 | 8/2005 | Beaumont |
| 2005/0192488 | A1 | 9/2005 | Bryenton et al. |
| 2005/0203357 | A1 | 9/2005 | Debreczeny et al. |
| 2005/0228248 | A1 | 10/2005 | Dietiker |
| 2005/0267346 | A1 | 12/2005 | Faber et al. |
| 2005/0283059 | A1 | 12/2005 | Iyer et al. |
| 2006/0009688 | A1 | 1/2006 | Lamego et al. |
| 2006/0015021 | A1 | 1/2006 | Cheng |
| 2006/0020181 | A1 | 1/2006 | Schmitt |
| 2006/0030763 | A1 | 2/2006 | Mannheimer et al. |
| 2006/0052680 | A1 | 3/2006 | Diab |
| 2006/0058683 | A1 | 3/2006 | Chance |
| 2006/0064024 | A1 | 3/2006 | Schnall |
| 2006/0092414 | A1* | 5/2006 | Geshwind et al. ............ 356/310 |
| 2006/0195028 | A1 | 8/2006 | Hannula et al. |
| 2006/0211930 | A1 | 9/2006 | Scharf |
| 2006/0224058 | A1 | 10/2006 | Mannheimer |
| 2006/0247501 | A1 | 11/2006 | Ali |
| 2006/0258921 | A1 | 11/2006 | Addison et al. |
| 2007/0219439 | A1 | 9/2007 | Vilser |
| 2008/0027299 | A1 | 1/2008 | Tobola |
| 2008/0097173 | A1 | 4/2008 | Soyemi |
| 2008/0132771 | A1 | 6/2008 | Parker |
| 2008/0167541 | A1 | 7/2008 | Takala |
| 2008/0167564 | A1 | 7/2008 | Hete |

FOREIGN PATENT DOCUMENTS

| | | |
|---|---|---|
| EP | 1491135 | 12/2004 |
| JP | 3170866 | 7/1991 |
| JP | 3238813 | 10/1991 |
| JP | 4332536 | 11/1992 |
| JP | 7124138 | 5/1995 |
| JP | 7136150 | 5/1995 |
| JP | 2003194714 | 7/2003 |
| JP | 2003210438 | 7/2003 |
| JP | 2004008572 | 1/2004 |
| JP | 2004113353 | 4/2004 |
| JP | 2004194908 | 7/2004 |
| JP | 2004248819 | 9/2004 |
| JP | 2004290545 | 10/2004 |
| JP | 25169020 | 6/2005 |
| JP | 26239267 | 9/2006 |
| JP | 26271815 | 10/2006 |
| WO | WO9101678 | 2/1991 |
| WO | WO9309711 | 5/1993 |
| WO | WO9843071 | 10/1998 |
| WO | WO9932030 | 7/1999 |
| WO | WO0021438 | 4/2000 |
| WO | WO2006097437 | 9/2006 |
| WO | WO2006126154 | 11/2006 |

OTHER PUBLICATIONS

Edrich, Thomas, et al.; "Can the Blood Content of the Tissues be Determined Optically During Pulse Oximetry Without Knowledge of the Oxygen Saturation?—An In-Vitro Investigation," *Proceedings of the 20$^{th}$ Annual International conference of the IEEE Engie in Medicine and Biology Society*, vol. 20, No. 6, p. 3072-3075, 1998.

Such, Hans Olaf; "Optoelectronic Non-invasive Vascular Diagnostics Using multiple Wavelength and Imaging Approach," *Dissertation*, (1998).

Todd, Bryan, et al.; "The Identification of Peaks in Physiological Signals," *Computers and Biomedical Research*, vol. 32, pp. 322-335 (1999).

Goldman, Julian M.; "Masimo Signal Extraction Pulse Oximetry," *Journal of Clinical Monitoring and Computing*, vol. 16, pp. 475-483 (2000).

Coetzee, Frans M.; "Noise-Resistant Pulse Oximetry Using a Synthetic Reference Signal," *IEEE Transactions on Biomedical Engineering*, vol. 47, No. 8, Aug. 2000, pp. 1018-1026.

Kaestle, S.; "Determining Artefact Sensitivity of New Pulse Oximeters in Laboratory Using Signals Obtained from Patient," *Biomedizinische Technik*, vol. 45 (2000).

Belal, Suliman Yousef, et al.; "A fuzzy system for detecting distorted plethysmogram pulses in neonates and paediatric patients," *Physiol. Meas.*, vol. 22, pp. 397-412 (2001).

Chan, K.W., et al.; "17.3: Adaptive Reduction of Motion Artifact from Photoplethysmographic Recordings using a Variable Step-Size LMS Filter," *IEEE*, pp. 1343-1346 (2002).

Cyrill, D., et al.; "Adaptive Comb Filter for Quasi-Periodic Physiologic Signals," *Proceedings of the 25$^{th}$ Annual International Conference of the IEEE EMBS*, Cancun, Mexico, Sep. 17-21, 2003; pp. 2439-2442.

Stetson, Paul F.; "Determining Heart Rate from Noisey Pulse Oximeter Signals Using Fuzzy Logic," *The IEEE International Conference on Fuzzy Systems*, St. Louis, Missouri, May 25-28, 2003; pp. 1053-1058.

Lee, C.M., et al.; "Reduction of motion artifacts from photoplethysmographic recordings using wavelet denoising approach," *IEEE EMBS Asian-Pacific Conference on Biomedical Engineering*, Oct. 20-22, 2003; pp. 194-195.

A. Johansson; "Neural network for photoplethysmographic respiratory rate monitoring," *Medical & Biological Engineering & Computing*, vol. 41, pp. 242-248 (2003).

Addison, Paul S., et al.; "A novel time-frequency-based 3D Lissajous figure method and its application to the determination of oxygen saturation from the photoplethysmogram," *Institute of Physic Publishing, Meas. Sci. Technol.*, vol. 15, pp. L15-L18 (2004).

Cysewska-Sobusaik, Anna; "Metrological Problems With noninvasive Transillumination of Living Tissues," *Proceedings of SPIE*, vol. 4515, pp. 15-24 (2001).

Maletras, Francois-Xavier, et al.; "Construction and calibration of a new design of Fiber Optic Respiratory Plethysmograph (FORP)," *Optomechanical Design and Engineering, Proceedings of SPIE*, vol. 4444, pp. 285-293 (2001).

Relente, A.R., et al.; "Characterization and Adaptive Filtering of Motion Artifacts in Pulse Oximetry using Accelerometers," *Proceedings of the Second joint EMBS/BMES Conference*, Houston, Texas, Oct. 23-26, 2002; pp. 1769-1770.

\* cited by examiner

SYSTEM AND METHOD FOR UNMIXING SPECTROSCOPIC OBSERVATIONS WITH NONNEGATIVE MATRIX FACTORIZATION

RELATED APPLICATIONS

This application claims priority to U.S. Provisional Application No. 61/072096, fled Mar. 27, 2008, and is incorporated herein by reference in its entirety.

BACKGROUND

The present disclosure relates generally to the field of spectroscopy and, more particularly, to a system and method of processing spectroscopic data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spectroscopy may be employed to ascertain the existence and/or concentration of component chemicals in a sample. To perform a spectroscopic analysis on a sample, a source may first send electromagnetic radiation through the sample. The spectrum of electromagnetic radiation which passes through the sample may indicate the absorbance and/or scattering of various constituent components of the sample. Based on the amount and spectrum of the sample absorbance, the presence and/or concentration of distinct chemicals may be detected by employing methods of spectrographic data processing.

Common spectrographic data processing techniques for multicomponent samples may include, for example, regression analysis involving ordinary least squares (OLS) or partial least squares (PLS). Such techniques may rely on assumptions that the signal strength of each component's absorbance spectrum is proportional to its concentration and that the component spectra add linearly.

The above assumptions do not hold, however, for all multicomponent samples. When electromagnetic radiation passes through a turbid multicomponent sample, for example, the radiation is scattered and the radiation path changes. As a result, radiation exiting the sample may not be detected or, if detected, the absorbance spectra of the radiation may change as the radiation takes a more circuitous path through the sample. Radiation passing through a heterogeneous multicomponent sample may produce similarly distorted results, as some of the radiation may be neither scattered nor absorbed by the sample. As a result, the perceived effective absorption of the sample has a nonlinear response to changes in absorption coefficient. Real-world examples of turbid and heterogeneous multicomponent samples may include, for example, whole blood or mixtures from industrial chemical processes.

Optional preprocessing, such as the software package EMSC, may correct for some deficiencies in the Beer's Law linear model which may result with some multicomponent samples. However, the techniques discussed above may not necessarily produce positive concentrations and may fail to account for the presence of unknown components. Moreover, the techniques may not admit a formulation suitable for heteroscedastic models, may not allow simultaneous projection of spectra onto row and column spaces, and/or may be exceedingly complex.

SUMMARY

Certain aspects commensurate in scope with the original claims are set forth below. It should be understood that these aspects are presented merely to provide the reader with a brief summary of certain embodiments and that these aspects are not intended to limit the scope of the claims. Indeed, the disclosure and claims may encompass a variety of aspects that may not be set forth below.

In accordance with one embodiment, a method of processing spectrographic data may include receiving optical absorbance data associated with a sample and iteratively computing values for component spectra using nonnegative matrix factorization. The values for component spectra may be iteratively computed until optical absorbance data is approximately equal to a Hadamard product of a pathlength matrix and a matrix product of a concentration matrix and a component spectra matrix. The method may also include iteratively computing values for pathlength using nonnegative matrix factorization, in which pathlength values may be iteratively computed until optical absorbance data is approximately equal to a Hadamard product of the pathlength matrix and the matrix product of the concentration matrix and the component spectra matrix.

BRIEF DESCRIPTION OF THE DRAWINGS

Advantages of the disclosure may become apparent upon reading the following detailed description and upon reference to the drawings in which.

DETAILED DESCRIPTION

One or more embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
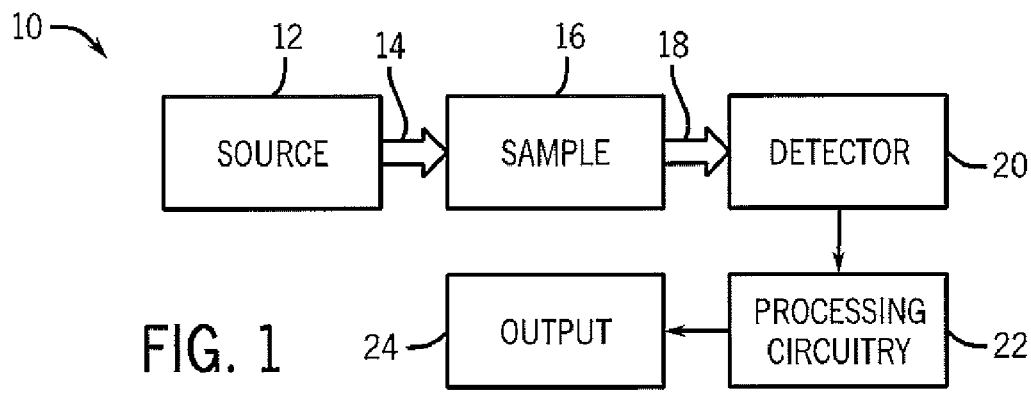
FIG. 1 is a block diagram of a spectroscopic system configured to process spectrographic data in accordance with an embodiment.

FIG. 1 illustrates a spectroscopy system 10 configured to process spectrographic data from a sample in accordance an embodiment. By way of example, the spectroscopy system 10 may be a laboratory tool for spectroscopy or a medical device for use on a patient. The spectroscopy system 10 may include an electromagnetic source 12, which emits an electromagnetic signal 14 at a sample 16. A portion of the electromagnetic signal 14 which passes through the sample 16 may be represented by an output signal 18. The output signal 18 may directly indicate the transmittance of the sample 16, which may provide an indirect indication of an absorbance of the sample 16.

A detector 20 may detect the output signal 18 to determine a set of optical absorbance data associated with the sample 16. Processing circuitry 22, which may be any electronic device or computer system capable of performing one of the spectrographic processing techniques discussed herein, for example, may receive the optical absorbance data associated with the sample 16 and perform spectrographic processing on the sample data. If the sample 16 is a multicomponent sample, the processing circuitry 22 may employ unmixing algorithms to compute spectral or concentration data for each of a plurality of components within the sample 16. The resulting processed data is received by an output 24, which may represent, for example, an electronic display, a printer, an electronic memory or storage device) or a remote network.

The processing circuitry 22 may utilize a variety of techniques for unmixing spectrographic data from a multicomponent sample. One such unmixing technique is an algorithm employing nonnegative matrix factorization, described herein below. Nonnegative matrix factorization may be employed in iterative algorithms for factoring a matrix into nonnegative matrices of presumably smaller rank. For example, given an m×n matrix V, an m×l matrix $W_0$, and an l×n matrix $H_0$, all the nonnegative, nonnegative matrix factorization may iteratively produce a matrix $W_k$ and a matrix $H_k$ such that $V \approx W_k H_k$. Each iterative update of $W_k$ and $H_k$ decreases the Frobenius norm of $V - W_k H_k$. The Frobenius norm may be defined according to the following equation:

$$\|A\|_{Fro} = \sqrt{\sum_{ij} A_{ij}^2}. \tag{1}$$

The iterative algorithm may update $W_k$ and $H_k$ one at a time. As such, a first half of the update may involve finding $H_{k+1}$ such that V is approximately equal to $W_k H_{k+1}$. It is sufficient to solve this sub-problem, because the update of $W_k$ may be subsequently formulated by way of a matrix transpose, reducing neatly to finding $W_{k+1}$ such that $V^T$ is approximately equal to $H_{k+1}^T W_{k+1}^T$.

Because the update of $H_k$ may be performed by taking a Hadamard product of $H_k$ by some matrix computed by V, $H_k$ and $W_k$, when V, $H_k$, $W_k$ are nonnegative, the updated matrix may be nonnegative. The update may be expressed by the following equation:

$$H_k \leftarrow H_k \square (W_k^T V \varnothing W_k^T W_k H_k). \tag{2}$$

In the above equation, the Hadamard product $\square$ may be described according to the following property:

$$A \square B = \begin{bmatrix} A_{1,1} B_{1,1} & A_{1,2} B_{1,2} & \ldots & A_{1,n} B_{1,n} \\ A_{2,1} B_{2,1} & A_{2,2} B_{2,2} & \ldots & A_{2,n} B_{2,n} \\ \vdots & \vdots & \ddots & \vdots \\ A_{m,1} B_{m,1} & A_{m,2} B_{m2} & \ldots & A_{m,n} B_{m,n} \end{bmatrix}. \tag{3}$$

Similarly, the Hadamard quotient Ø may be described according to the property described in equation (4) below. It should be noted that the Hadamard product or quotient of nonnegative matrices will be nonnegative by definition.

$$A \varnothing B = \begin{bmatrix} A_{1,1}/B_{1,1} & A_{1,2}/B_{1,2} & \ldots & A_{1,n}/B_{1,n} \\ A_{2,1}/B_{2,1} & A_{2,2}/B_{2,2} & \ldots & A_{2,n}/B_{2,n} \\ \vdots & \vdots & \ddots & \vdots \\ A_{m,1}/B_{m,1} & A_{m,2}/B_{m,2} & \ldots & A_{m,n}/B_{m,n} \end{bmatrix}. \tag{4}$$

Because the minimization procedure need not update both factors, this procedure may provide an attractive alternative to the common ordinary least squares (OLS) and partial least squares (PLS) regression for estimating concentrations of analytes in a linear mixing model. Thus, if rows of $H_0$ represent the nonnegative spectra of l relevant pure components, and rows of V represent observed spectra of mixtures of the l relevant pure components, the update may be used to produce a matrix $W_k$ such that V is approximately equal to $W_k H_0$. The rows of the matrix $W_k$ may subsequently be interpreted as strictly nonnegative component concentrations for each observed sample.

By considering several generalizations, the above technique may be more appropriately adapted for chemometrics and optical sensing with little required computational overhead. First, nonnegative matrix factorization may be used in projecting to a set of given row and column spaces. Considering the problem of factoring a given m×n matrix V≈CGR, where C and R represent fixed matrices of size m×i and j×n, respectively, only matrix G remains to be found. Factorization may approximate V by a matrix whose columns are in the column space of C and whose rows are the in the row space of R.

In addressing this problem, the following lemma may be applied:

Lemma 1.1. Let $\Phi(G) = \|V - CGR\|_{Fro}$, where V, C and R are given positive matrices. Then the Update:

$$G_{k=1} \leftarrow G_K \square (C^T V R^T) \varnothing C^T C G_k R R^T \tag{5}$$

decreases $\Phi: \Phi(G_{k=1}) \leq \Phi(G_k)$.

The result above implies the result found with conventional nonnegative matrix factorization by permitting C or R to serve as an identity matrix. It should be noted that this multiplicative update maintains positivity.

For use in chemometrics, the differences in path link at different wavelengths should also be considered. A more general model sufficient for this purpose may be represented by the following approximation:

$$V \approx L \square (CGR) \tag{6}.$$

In the equation (6) above, matrices C and R are fixed. Using the same index re-arrangement as Lemma 1.1, the following iterative update may be obtained:

Lemma 1.2. Let $\Phi(G) = \|V - L \square CGR\|_{Fro}$, where V, L, C and R are given positive matrices. Then the update $$G_{k=1} \leftarrow G_k \square (C^T [L \square V] R^T) \varnothing C^T [L \square L \square CG_k R] R^T \tag{7}$$

decreases $\Phi: \Phi(G_{k+1}) \leq \Phi(G_k)$.

Additionally, a weighted norm may be minimized using nonnegative matrix factorization. Taking F as weighting matrix of m×n positive elements, a Γ-weighted Frobenius norm may be described according to the following equation:

$$\|A\|_{\Gamma,Fro} = \|\Gamma^{\frac{1}{2}} \square A\|_{Fro} = \sqrt{\sum_{i,j} \Gamma_{i,j} A_{i,j}^2}. \qquad (8)$$

One natural choice for the matrix Γ is the Hadamard inverse of the Hadamard square of V, defined as $\Gamma_{i,j} = V_{i,j}^{-2}$. This allows the minimization of the relative error in the approximation V≈L☐CGR, rather than the absolute error. This may be more appropriate if the values in V span different scales. One problem with this choice of Γ is if any elements of V are zero. Because of this, the choice $\Gamma_{i,j} = (\max(\epsilon, V_{i,j}))^{-2}$ may be recommended, where ε is some small quantity which should be tuned to match the sensitivity of the device used to take the optical measurements.

With the foregoing in mind, by applying index rearrangement, the following lemma may be obtained:

Lemma 1.3. Let Φ(G)=‖V−L☐CGR‖$_{\Gamma,Fro}$, where V, L, C and R are given positive matrices, and Γ is fixed. Then the Update $$G_{k+1} \leftarrow G_k \square \frac{(C^T[L \square \Gamma \square V]R^T) \oslash C^T[L \square \Gamma \square L \square CG_k R]}{R^T} \qquad (9)$$

decreases Φ: Φ(G$_{k+1}$)≦(G$_k$).

Lemma 1.3 above is relevant for a diagonal weighting matrix. The lemma may be adapted to a more general case using tensor notation, since in the general case, the weighting function is a bilinear form on two matrices. Because the above equations minimize the Frobenius norm, the matrices may be equivalently vectorized to obtain the following lemma:

Lemma 1.4. Let Φ(g)=(v−l☐Cg)$^T$Γ(v−l☐Cg), where v, l are given positive vectors, C is a given positive matrix, and Γ is a given symmetric positive definite matrix. Then the update $$g_{k+1} \leftarrow g_k \square (C^T[l \square \Gamma v] \oslash C^T[l \square \Gamma(l \square Cg_k)]) \qquad (10)$$

decreases Φ: Φ(g$_{k+1}$)≦Φ(g$_k$).

Equations (5), (7), (9), and (10) describing applications of nonnegative matrix factorization may be employed for spectrographic processing by processing circuitry 22. Particularly, two related problems may be addressed by the use of nonnegative matrix factorization. First, optical spectra chemical components may be estimated when component concentrations are known. Second, component concentrations may be estimated when optical spectra are known. The use of nonnegative matrix factorization may be used to replace or supplement traditional techniques for solving the above problems because, among other reasons, nonnegative matrix factorization renders positive concentrations.

Figure 2:
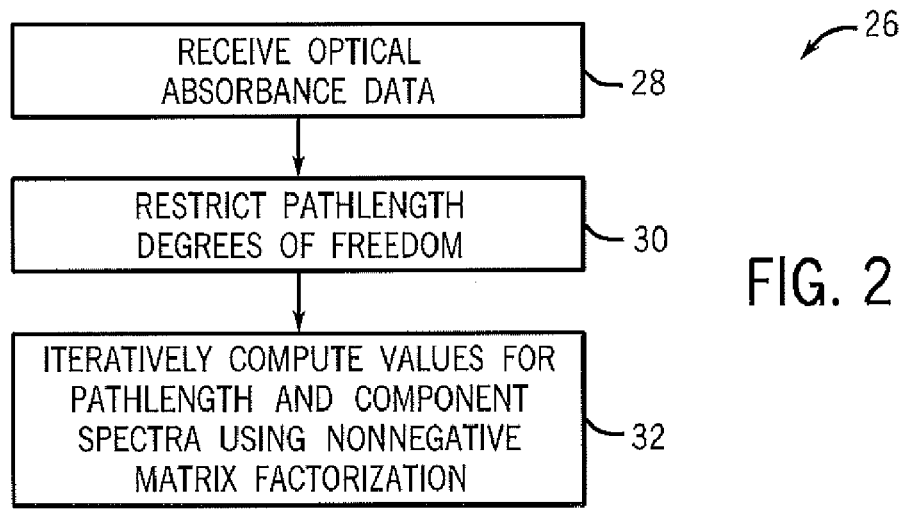
FIG. 2 is a flowchart illustrating a method of processing spectrographic data from a multicomponent sample when component concentrations are known.

Turning to FIG. 2, a flowchart 26 illustrates the use of nonnegative matrix factorization to process spectrographic data when component concentrations are known, according to an embodiment. In a first step 28, optical absorbance data from the detector 20 or another data source may be received by the processing circuitry 22. The optical absorbance data may represent data observed in n channels of m objects, each being assumed to consist of a mixture of l chemical components. As such, the optical absorbance data may be represented by an m×n matrix Z. The known concentrations of the l components may be represented by an m×l matrix K. To find an l×n matrix for a component spectra matrix S, the following approximation may be employed:

$$Z \approx L \square KS \qquad (11).$$

In equation (11) above, each row of matrix L holds a row dependent vector of pathlengths to be determined. This formulation may be particularly appropriate for, among other things, extracting pure component absorption spectra from tissue phantom data with correction for scattering effects on pathlength.

If matrix L is permitted to vary freely, too many degrees of freedom may arise. In fact, more variables could exist in matrix L and matrix S, as determined by the above algorithm, than are available from the optical absorbance data Z. In step 30, to reduce the total degrees of freedom, the pathlength matrix L may be approximated as a linear combination of some small number of basis functions. By assuming there are nonnegative n-dimensional vectors $f^{(1)}, \ldots f^{(p)}$ whose span includes pathlength vectors which should be allowed, the pathlength matrix L may be assumed to be equal to a matrix product of matrices B and F, where F is a matrix whose rows represent the vectors $f^{(i)}$.

Applying equation (11), in step 32, component spectra matrix S and pathlength basis matrix B may be determined by iteratively computing B$_k$ and S$_k$ using the nonnegative matrix factorization algorithms above, such that $$Z \approx (B_k F) \square (KS_k) \qquad (12).$$

It should be noted that one choice of matrix F may involve the use of polynomials in the wavelength, i.e., $f^{(i)} = \lambda^{i-1}$. For nonnegative wavelengths, the use of polynomials in the wavelength produces a nonnegative matrix F, as desired. However, if B$_k$ is to be updated by a multiplicative iteration, to assure that L remains nonnegative, only pathlengths which are increasing in wavelength could be represented. This may be undesirable. Because pathlengths should be allowed to vary arbitrarily across the wavelength spectrum, a different of collection of basis functions may be used, such as B-splines.

The desirability of the uses of B-splines may become apparent in light of the foregoing discussion. Because the nonnegative matrix factorization techniques force parameters to be nonnegative, polynomials are not an acceptable basis, as a polynomial with positive coefficients may only represent an increasing function when restricted to positive real numbers. B-splines represent a simple alternative to polynomials. By defining p "knots" in an interval [a, b], including the end points, the degree q B-splines on those knots represent p functions which are piecewise q-dimensional polynomials which support an integral with knots as end points. Due to their compact support, one may approximate decreasing, increasing, and monotonic functions by nonnegative combinations of B-splines.

Figure 3:
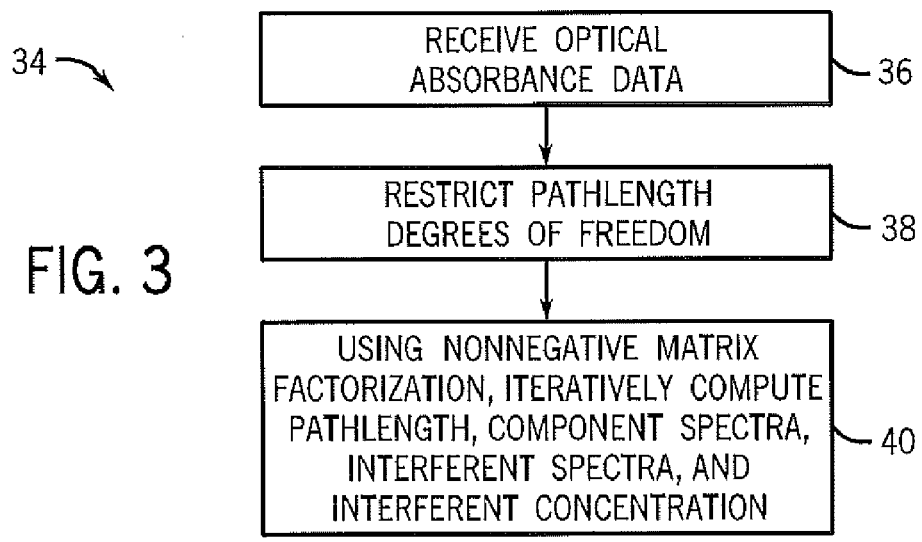
FIG. 3 is a flowchart illustrating a method of processing spectrographic data from a multicomponent sample having absorptive interferents when component concentrations are known.

FIG. 3 depicts a flowchart 34 for processing spectrographic data when sample components concentrations are known, but additional absorptive interferents may be present, according to an embodiment. As above, in a first step 36, optical absorbance data from the detector 20 or another data source may be received by the processing circuitry 22. The optical absorbance data may represent data observed in n channels of mi objects, each being assumed to consist of a mixture of l chemical components. As such, the optical absorbance data may be represented by an m×n matrix Z. The known concentrations of the l components may be represented by an m×l matrix K. Each row of a pathlength matrix L may hold a row dependent vector of pathlengths to be determined. As above, an l×n matrix S may represent component spectra, which are unknown.

In step 38, to reduce the total degrees of freedom, the pathlength matrix L may be approximated as a linear combination of some small number of basis functions. By assuming there are nonnegative n-dimensional vectors $f^{(1)}, \ldots f^{(p)}$ whose span includes pathlength vectors which should be allowed, the pathlength matrix L may be assumed to be equal to a matrix product of matrices B and F, where F is a matrix whose rows represent the vectors $f^{(i)}$. The matrix F may involve the use of polynomials in the wavelength, i.e., $f^{(i)}=\lambda^{i-1}$, but may more effectively involve the use of B-splines instead, as discussed above.

To account for unknown absorptive interferents in a multicomponent sample, equation (12) above may be altered as follows:

$$Z \approx (B_k F) \Box (KS_k + J_k R_k) \quad (13).$$

In equation (13) above, $J_k$ and $R_k$ represent nonnegative concentrations and spectra of interferents, respectively, and both are matrices of rank q. Under principles of matrix multiplication, the above equation may be written as:

$$Z \approx (B_k F) \Box \left( [KJ_k] \begin{bmatrix} S_k \\ R_k \end{bmatrix} \right). \quad (14)$$

In step 40, iterative updates with the nonnegative matrix factorization algorithm of equations (5), (7), (9), or (10) may be performed on $B_k$, $J_k$, $R_k$, and $S_k$, to obtain component spectra S. Masking may be used to prevent the value of K from being altered. However, if desired, particularly if uncertainty exists in the concentration term K, the matrix K may also be iteratively updated. Under such conditions, however, the concentration matrix K should only be updated a limited number of times.

Figure 4:
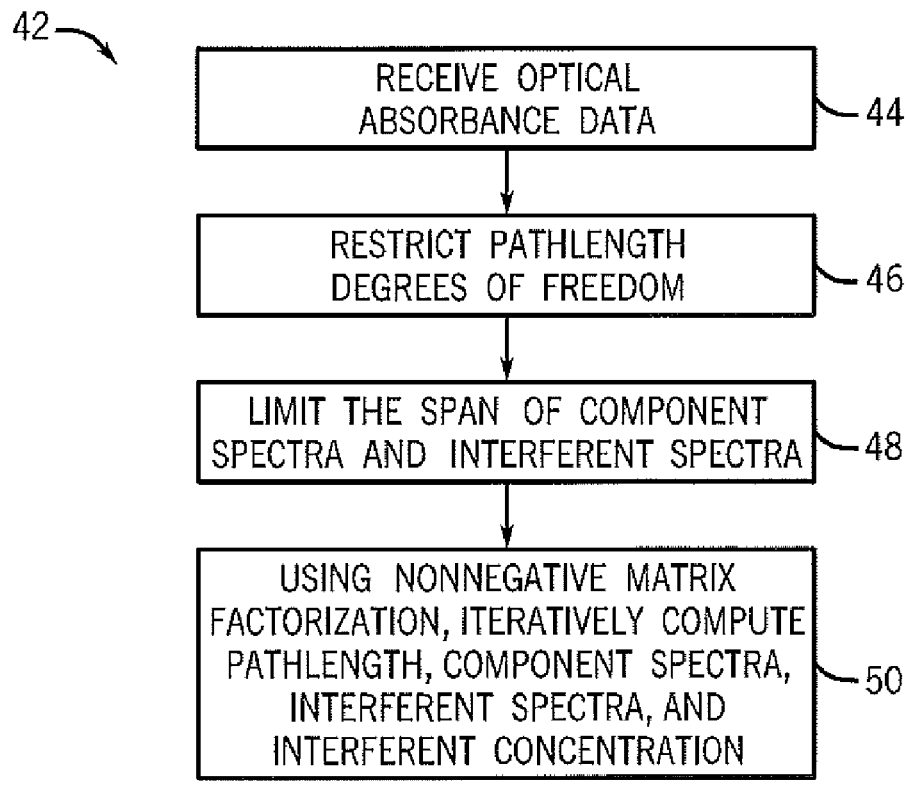
FIG. 4 is a flowchart illustrating another method of processing spectrographic data from a multicomponent sample having absorptive interferents when component concentrations are known.

FIG. 4 represents a flowchart 42 describing processing of spectrographic data when spectra concentrations are known and additional unknown chemical absorbance may be accounted for, and the spectra are limited to a particular vector of space, according to an embodiment. As above, in a first step 44, optical absorbance data from the detector 20 or another data source may be received by the processing circuitry 22. The optical absorbance data may represent data observed in n channels of m objects, each being assumed to consist of a mixture of l chemical components. As such, the optical absorbance data may be represented by an m×n matrix Z. The known concentrations of the l components may be represented by an m×l matrix K. Each row of a pathlength matrix L may hold a row dependent vector of pathlengths to be determined. As above, an l×n matrix S may represent component spectra, which are unknown.

In step 46, to reduce the total degrees of freedom, the pathlength matrix L may be approximated as a linear combination of some small number of basis functions. By assuming there are nonnegative n-dimensional vectors $f^{(1)}, \ldots f^{(p)}$ whose span includes pathlength vectors which should be allowed, the pathlength matrix L may be assumed to be equal to a matrix product of matrices B and F, where F is a matrix whose rows represent the vectors $f^{(i)}$. The matrix F may involve the use of polynomials in the wavelength, i.e., $f^{(i)}=\lambda^{i-1}$, but may more effectively involve the use of B-splines instead, as discussed above.

To account for unknown absorptive interferents in a multicomponent sample, equation (14), in which additional absorptive interferents are modeled by matrices J and R, may be employed. Rather than iteratively compute the various matrices according to equation (14), however, spectral terms may be first limited.

In step 48, the spectral terms $S_k$ and $R_k$ may be limited. Allowing the spectral terms $S_k$ and $R_k$ to vary freely may result in a non-smooth estimate, particularly in regions of the spectrum where optical density is very high, e.g., near the 1500 nm "water band." The model of equation (14) may be expanded to limit the spectra to a particular vector space. Letting the rows of a matrix T span the desired vector space, the following equation may be obtained:

$$Z \approx (B_k F) \Box \left( [KJ_k] \begin{bmatrix} S_k \\ R_k \end{bmatrix} T \right). \quad (15)$$

In step 50, iterative updates with the nonnegative matrix factorization algorithm of equations (5), (7), (9), or (10) may be performed on $B_k$, $J_k$, $R_k$, and $S_k$, to obtain component spectra S. The rows of T may employ B-splines to reduce the degrees of freedom of the model.

Figure 5:
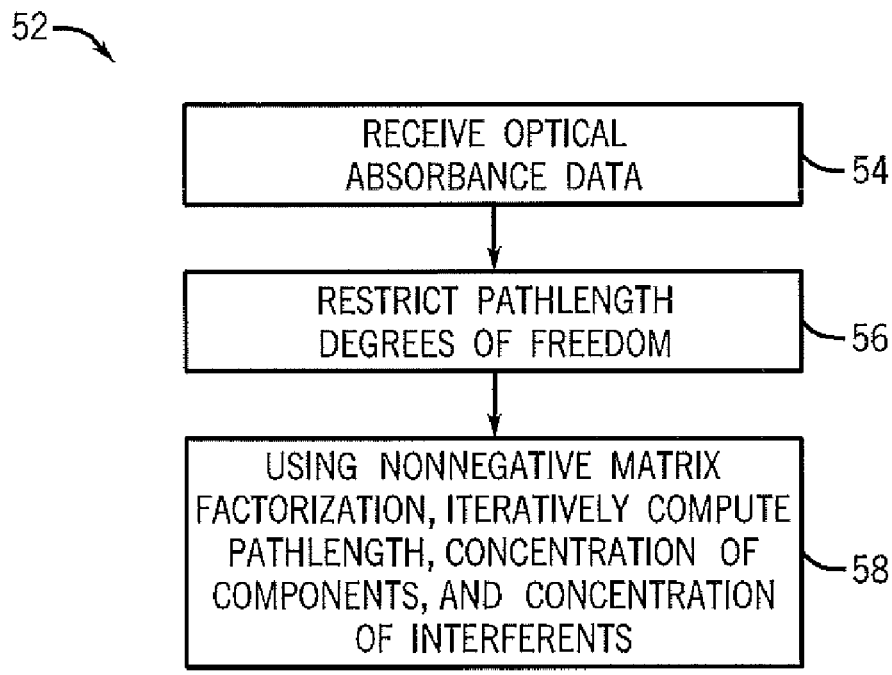
FIG. 5 is a flowchart illustrating a method of processing spectrographic data from a multicomponent sample having absorptive interferents when component spectra are known.

Turning to FIG. 5, a flowchart 52 represents a method of processing spectrographic data when component spectra are known but component concentrations are unknown, according to an embodiment. In step 54, optical absorbance data from the detector 20 or another data source may be received by the processing circuitry 22. The optical absorbance data may represent data observed in n channels of m objects, each being assumed to consist of a mixture of l chemical components. As such, the optical absorbance data may be represented by an m×n matrix Z. Each row of a pathlength matrix L may hold a row dependent vector of pathlengths to be determined. An l×n matrix S may represent the known component spectra, while the unknown concentrations of the l components may be represented by an m×l matrix K. A model which corrects for scattering and unknown components, while simultaneously accounting for pathlength variation, may be described according to the following equation:

$$Z \approx L \Box (KS+Q) \quad (16).$$

In the above equation, Q represents a "fudge factor" which accounts for unknown components and scattering. To avoid overwriting, Q should have a rank much smaller than m and n. Thus, Q should factor as Q=JR.

In step 56, to reduce the total degrees of freedom, the pathlength matrix L may be approximated as a linear combination of some small number of basis functions. By assuming there are nonnegative n-dimensional vectors $f^{(1)}, \ldots f^{(p)}$ whose span includes pathlength vectors which should be allowed, the pathlength matrix L may be assumed to be equal to a matrix product of matrices B and F, where F is a matrix whose rows represent the vectors $f^{(i)}$. The matrix F may involve the use of polynomials in the wavelength, i.e., $f^{(i)}=\lambda^{i-1}$, but may more effectively involve the use of B-splines instead, as discussed above. After incorporating the "fudge factor" and reducing the total degrees of freedom of the pathlength matrix, the following relationship results.

$$Z \approx (B_k F) \Box \left( [K_k J_k] \begin{bmatrix} S \\ R \end{bmatrix} \right). \quad (17)$$

In step 58, iterative updates with the nonnegative matrix factorization algorithm of equations (5), (7), (9), or (10) may be performed on $B_k$, $J_k$, and $K_k$ to obtain component concentrations K. Because F, S, and R are fixed, any dependence on the columns of the data Z is eliminated. As a result, the above processing may be performed sequentially or on parallel processors on the spectrum of each object without affecting overall results. In other words, information may be discovered about each sample, but no information about the channels, such as the spectra of the pure components, may interfere.

The rows of matrix R span the space of the "fudge factor." In the framework of nonnegative matrix factorization, the "fudge factor" would most likely be best represented by B-splines, making B-splines a better choice for the rows of R. It should be noted, however, that the use of B-splines for the rows of R increases the degrees of freedom.

Step 58 may alternatively be performed according to Lemma 1.3, involving the use of a weighted Frobenius from formulation. One may note that at certain wavelengths, a spectrometer may be subject to higher levels of noise which may occur in certain processes, such as filtering. Additionally, one may note that the actual absorbance of the sample may be high, causing stray light effects to be significant. In such a case, one only need form $\Gamma$ with a magnitude inverse to the expect level of noise and use the nonnegative matrix factorization update introduced by Lemma 1.3.

A variety of choices for $\Gamma$ should be noted. As discussed above, one choice of $\Gamma$ may be to essentially take the inverse of the square of V. Additionally or alternatively, the well-known approach of Iteratively Reweighted Least Squares may also be taken, in which case the nonnegative matrix factorization procedure is iteratively repeated to give a new estimate of $\Gamma$ which is based on the residual (i.e, the error of approximation).

Figure 6:
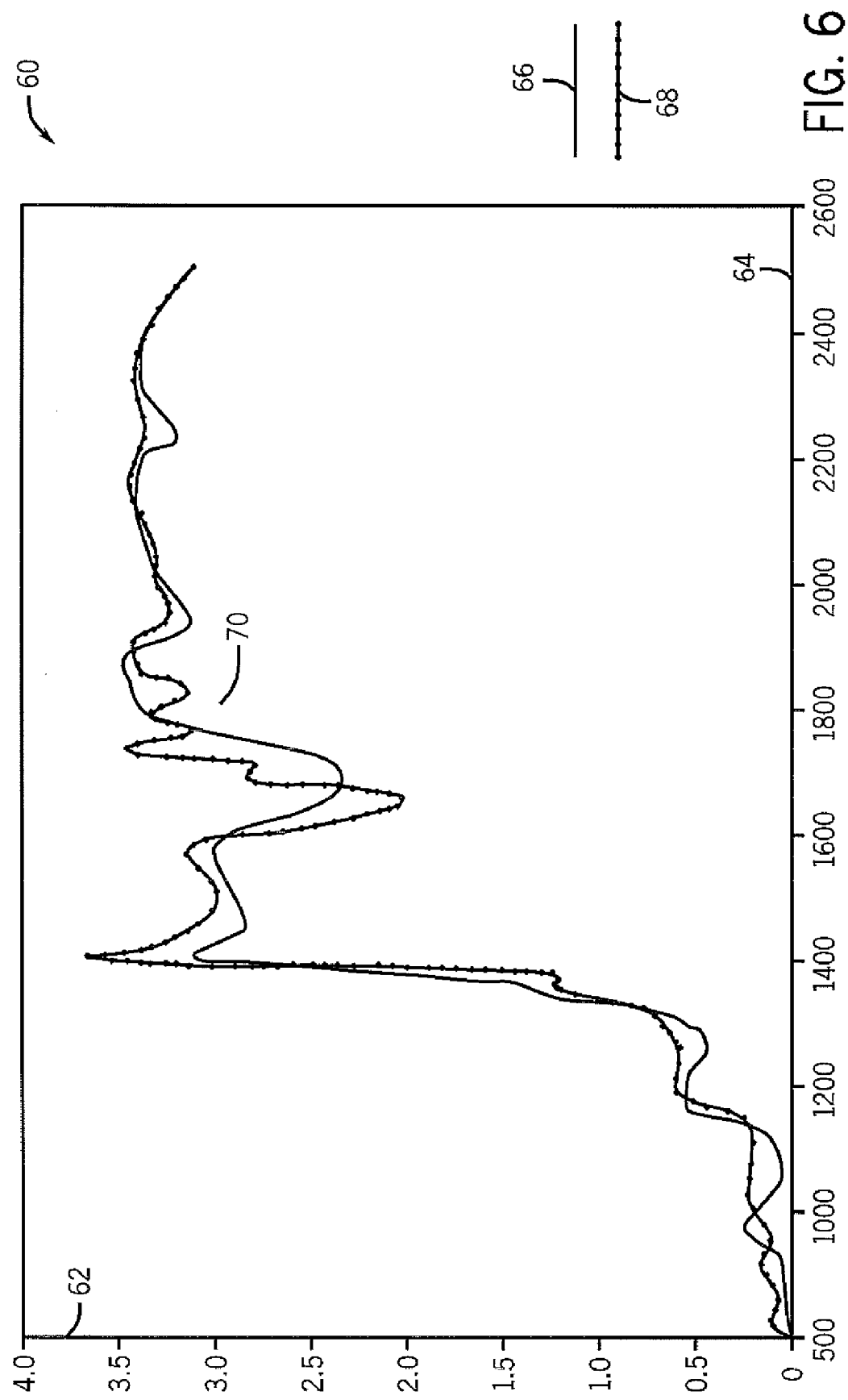
FIG. 6 is a spectrographic plot of spectra from a two-component sample which may result from processing spectrographic data in accordance with one embodiment.

FIG. 6 represents a spectrographic plot 60, which plots absorbance spectra for two components, according to an embodiment. An ordinate 62 represents absorbance, and an abscissa 64 represents a wavelength of absorbed light in nanometers (nm). Two components whose spectra is depicted by the spectrographic plot 60 include a buffer, represented on the spectrographic plot as buffer absorbance 66 and gelatin, represented on the spectrographic plot 60 as gelatin absorbance 68. It should be noted that using nonnegative factorization to process the spectrographic data, additional plot details 70 may emerge that may not become apparent using conventional unmixing techniques.

Figure 7:
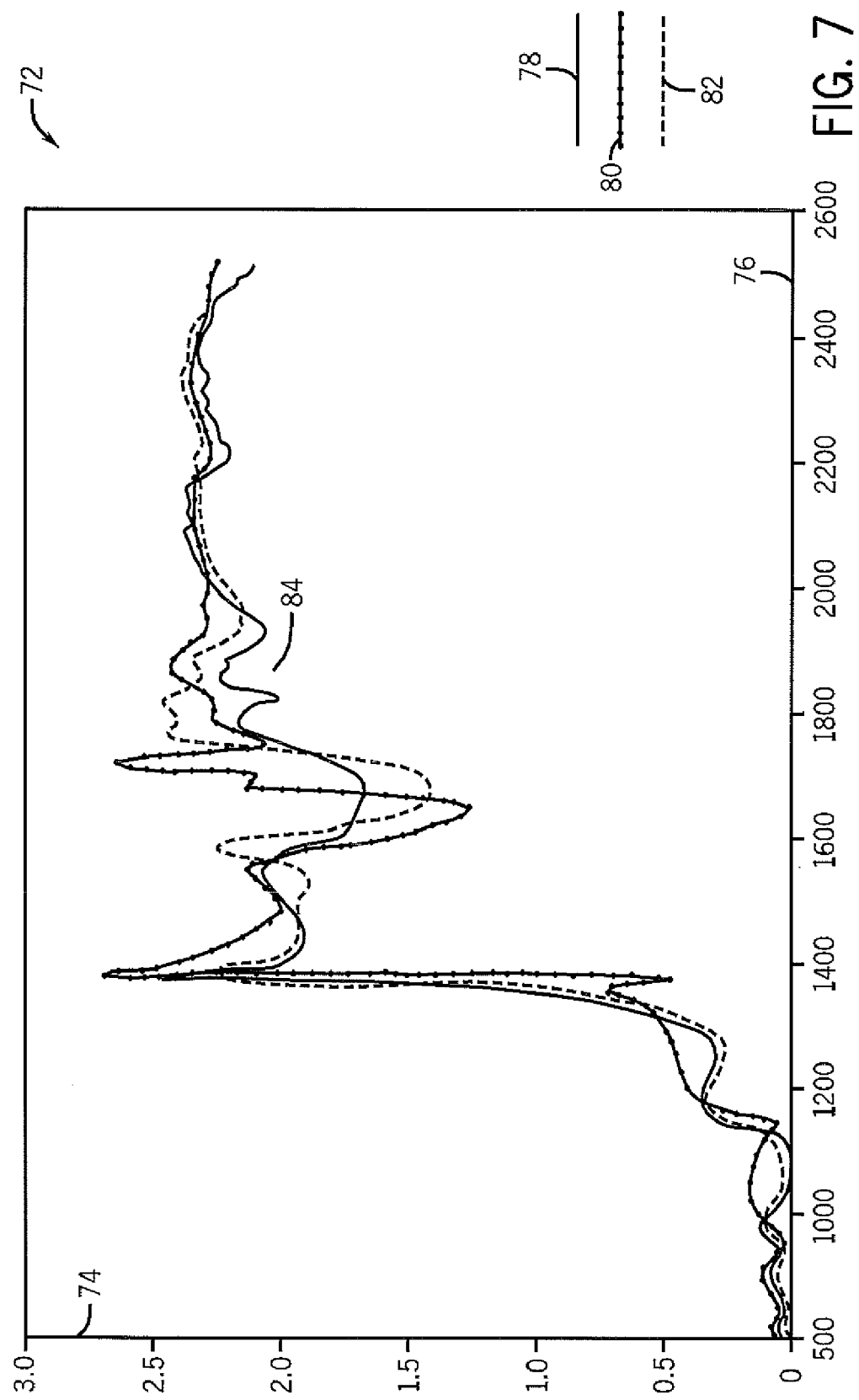
FIG. 7 is a spectrographic plot of spectra from a two-component sample which may result from processing spectrographic data in accordance with another embodiment.

Similarly, FIG. 7 depicts a spectrographic plot 72 for two spectral components, with a further "fudge factor" applied as well. An ordinate 74 represents absorbance, and an abscissa 76 represents a wavelength of absorbed light in nanometers (nm). Two components whose spectra is depicted by the spectrographic plot 72 include a buffer, represented on the spectrographic plot as buffer absorbance 78 and gelatin, represented on the spectrographic plot 60 as gelatin absorbance 80. To compensate for additional absorptive interferents, a "fudge factor" absorbance 82 is plotted alongside buffer absorbance 78 and gelatin absorbance 80. In plot 72, as in plot 60, more plot details 84 may emerge using nonnegative factorization to perform spectrographic processing than using conventional techniques.

While the above disclosure may be susceptible to various modifications and alternative forms, various embodiments have been shown by way of example in the drawings and have been described in detail herein. However, it should be understood that the claims are not intended to be limited to the particular forms disclosed, Rather, the claims are to cover all modifications, equivalents, and alternatives falling within the spirit and scope of the disclosure. Particularly, it should be noted that the techniques described with reference to FIGS. 2-5 may be utilized individually or in any combination. Moreover, the steps of the techniques described with reference to FIGS. 2-5 may be performed in various orders other than the order recited with reference to each figure, as will be appreciated by those of ordinary skill in the art.

What is claimed is:

1. A method of processing spectrographic data comprising:
   emitting electromagnetic radiation at a sample;
   measuring optical absorbance of the electromagnetic radiation of the sample;
   receiving optical absorbance data associated with the sample; and
   iteratively computing values for component spectra based at least in part upon nonnegative matrix factorization, wherein iteratively computing values for component spectra using nonnegative matrix factorization comprises iteratively computing values for a component spectra matrix until optical absorbance data is approximately equal to a Hadamard product of a pathlength matrix and a matrix product of a concentration matrix and the component spectra matrix.

2. The method of claim 1, comprising iteratively computing values for pathlength based at least in part upon nonnegative matrix factorization.

3. The method of claim 2, wherein iteratively computing values for pathlength using nonnegative matrix factorization comprises iteratively computing values for a pathlength matrix until optical absorbance data is approximately equal to a Hadamard product of the pathlength matrix and a matrix product of a concentration matrix and a component spectra matrix.

4. The method of claim 1, wherein iteratively computing values for component spectra using nonnegative matrix factorization comprises limiting total pathlength degrees of freedom.

5. The method of claim 4, wherein total pathlength degrees of freedom are generally limited by approximating pathlength as a linear combination of basis functions.

6. The method of claim 1, wherein receiving optical absorbance data associated with the sample comprises receiving optical absorbance data associated with a multicomponent sample having absorptive interferents.

7. The method of claim 6, comprising iteratively computing values inteiferent spectra and interferent concentration using nonnegative matrix factorization.

8. The method of claim 7, wherein iteratively computing values for interferent spectra and interferent concentration using nonnegative matrix factorization comprises iteratively computing values for an inteiferent spectra matrix and an interferent concentration matrix until optical absorbance data is approximately equal to a Hadamard product of a pathlength matrix and a matrix sum of a matrix product of a concentration matrix and a component spectra matrix and a matrix product of the interferent spectra matrix and the interferent concentration matrix.

9. The method of claim 1, comprising receiving values of component concentrations.

10. A spectroscopy system comprising:
    an electromagnetic radiation source;
    an electromagnetic radiation detector configured to measure electromagnetic radiation from the source; and
    processing circuitry configured to receive optical absorbance data associated with a sample disposed between the source and the detector and to iteratively compute values for sample component concentrations or sample component spectra using nonnegative matrix factorization, wherein the processing circuitry is configured to iteratively compute values for component concentrations until optical absorbance data is approximately equal to a Hadamard product of a pathlength matrix and a matrix product of a component concentration matrix and a component spectra matrix.

11. The system of claim 10, wherein the processing circuitry is configured to iteratively compute values for component spectra until optical absorbance data is approximately equal to a Hadamard product of a pathlength matrix and a matrix product of a concentration matrix and the component spectra matrix.

12. The system of claim 10, wherein the processing circuitry is configured to receive optical absorbance data associated with a multicomponent sample.

13. The system of claim 10, wherein the processing circuitry is configured to receive optical absorbance data associated with a heterogeneous or turbid multicomponent sample.

14. A method of processing spectrographic data comprising:
emitting electromagnetic radiation at a heterogeneous or turbid multicomponent sample;
measuring electromagnetic absorbance of the electromagnetic radiation of the sample;
receiving electromagnetic absorbance data associated with the sample; and
iteratively computing values for sample component concentrations or sample component spectra such that only positive values are computed, wherein iteratively computing values for sample component concentrations or sample component spectra comprises using nonnegative matrix factorization, and wherein iteratively computing values for sample component concentrations or sample component spectra comprises using a weighted Frobenius norm having a weighting matrix equal to the Hadamard inverse of the Hadamard square of a matrix of component spectra.

15. The method of claim 14, wherein iteratively computing values for sample component concentrations or sample component spectra comprises using a weighted Frobenius norm having a weighting matrix chosen based on an iteratively reweighted least squares approach.

16. A method of processing spectrographic data comprising:
emitting electromagnetic radiation at a sample;
measuring optical absorbance of the electromagnetic radiation of the sample;
receiving optical absorbance data associated with the sample; and
iteratively computing values for component spectra based at least in part upon nonnegative matrix factorization; and
iteratively computing values for pathlength based at least in part upon nonnegative matrix factorization, wherein iteratively computing values for pathlength using nonnegative matrix factorization comprises iteratively computing values for a pathlength matrix until optical absorbance data is approximately equal to a Hadamard product of the pathlength matrix and a matrix product of a concentration matrix and a component spectra matrix.

17. A method of processing spectrographic data comprising:
emitting electromagnetic radiation at a multicomponent sample having absorptive interferents;
measuring optical absorbance of the electromagnetic radiation of the sample;
receiving optical absorbance data associated with the sample;
iteratively computing values for component spectra based at least in part upon nonnegative matrix factorization; and
iteratively computing values interferent spectra and interferent concentration using nonnegative matrix factorization, wherein iteratively computing values for interferent spectra and interferent concentration using nonnegative matrix factorization comprises iteratively computing values for an interferent spectra matrix and an interferent concentration matrix until optical absorbance data is approximately equal to a Hadamard product of a pathlength matrix and a matrix sum of a matrix product of a concentration matrix and a component spectra matrix and a matrix product of the interferent spectra matrix and the interferent concentration matrix.

18. A spectroscopy system comprising:
an electromagnetic radiation source;
an electromagnetic radiation detector configured to measure electromagnetic radiation from the source; and
processing circuitry configured to receive optical absorbance data associated with a sample disposed between the source and the detector and to iteratively compute values for sample component concentrations or sample component spectra using nonnegative matrix factorization, wherein the processing circuitry is configured to iteratively compute values for component spectra until optical absorbance data is approximately equal to a Hadamard product of a pathlength matrix and a matrix product of a concentration matrix and the component spectra matrix.

19. A method of processing spectrographic data comprising:
emitting electromagnetic radiation at a heterogeneous or turbid multicomponent sample;
measuring electromagnetic absorbance of the electromagnetic radiation of the sample;
receiving electromagnetic absorbance data associated with the sample; and
iteratively computing values for sample component concentrations or sample component spectra such that only positive values are computed, wherein iteratively computing values for sample component concentrations or sample component spectra comprises using nonnegative matrix factorization, and wherein iteratively computing values for sample component concentrations or sample component spectra comprises using a weighted Frobenius norm having a weighting matrix chosen based on an iteratively reweighted least squares approach.

* * * * *